United States Patent
Shin et al.

(10) Patent No.: US 7,139,746 B2
(45) Date of Patent: Nov. 21, 2006

(54) EXTENDED MARKUP LANGUAGE (XML) INDEXING METHOD FOR PROCESSING REGULAR PATH EXPRESSION QUERIES IN A RELATIONAL DATABASE AND A DATA STRUCTURE THEREOF

(75) Inventors: Hyo-seop Shin, Seoul (KR); Hye-soo Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 557 days.

(21) Appl. No.: 10/428,933

(22) Filed: May 5, 2003

(65) Prior Publication Data

US 2003/0212662 A1 Nov. 13, 2003

(30) Foreign Application Priority Data

May 8, 2002 (KR) ............. 10-2002-0025398

(51) Int. Cl.
*G06F 17/00* (2006.01)
(52) U.S. Cl. ............................ 707/2; 707/1
(58) Field of Classification Search ............ 707/2, 707/1
See application file for complete search history.

(56) References Cited

U.S. PATENT DOCUMENTS

| | | | | |
|---|---|---|---|---|
| 6,721,727 B1 * | 4/2004 | Chau et al. | ............ | 707/3 |
| 6,804,677 B1 * | 10/2004 | Shadmon et al. | ............ | 707/101 |
| 6,826,568 B1 * | 11/2004 | Bernstein et al. | ............ | 707/6 |
| 6,901,410 B1 * | 5/2005 | Marron et al. | ............ | 707/104.1 |
| 6,912,538 B1 * | 6/2005 | Stapel et al. | ............ | 707/10 |

FOREIGN PATENT DOCUMENTS

JP  2001-34619 A  2/2001

* cited by examiner

*Primary Examiner*—Apu M. Mofiz
(74) *Attorney, Agent, or Firm*—Sughrue Mion, PLLC

(57) ABSTRACT

Provided is a path index lookup method, i.e., an extended markup language (XML) indexing method by which a relational database can stably process a query regardless of how a user defines the query. In the path index lookup method, a regular path expression with a certain length can be processed through a single joining operation using a PathLookup table and an ExtendedEdge table. Thus, a regular path expression query, which is a core type of XML user query, can be stably and quickly processed regardless of how a user describes the query.

8 Claims, 9 Drawing Sheets

FIG. 1A

```
<ProgramInformation  programId="crid://www.nbc.com/news1.mpg">
  <BasicDescription>
    <Title>Sunrise News</Title>
    <Synopsis>Presented by Georgie Gardiner.</Synopsis>
    <Keywords> <Keyword>news</Keyword> </Keywords>
    <Genre href="urn:mpeg:TVAnytime_v0.1ContentCS">
                <Name>News</Name>
    </Genre>
    <CastList>
      <CastMember>
                            <Role>
            <Name>Reporter</Name>
        </Role>
        <Agent>
          <Name> <GivenName>Richard</GivenName>
                 <FamilyName>Anderson</FamilyName>
          </Name>
        </Agent>
      </CastMember>
    </CastList>
  </BasicDescription>
</ProgramInformation>
```

| SYMBOL | NOTATION |
|---|---|
| // | ANCESTOR–DESCENDANT RELATIONSHIP |
| * | EITHER NONE OR A PLURALITY OF ENTITIES |
| ? | EITHER NONE OR ONE ENTITY |
| \| | UNION |

FIG. 3

(a)
```
<section>
    <title> Information Retrieval Using RDBMS </title>
    <section>
        <title> Beyond Simple Translation </title>
        <section>
            <title> Extension of IR Feautres </title>
        </section>
    </section>
</section>
```

(b)
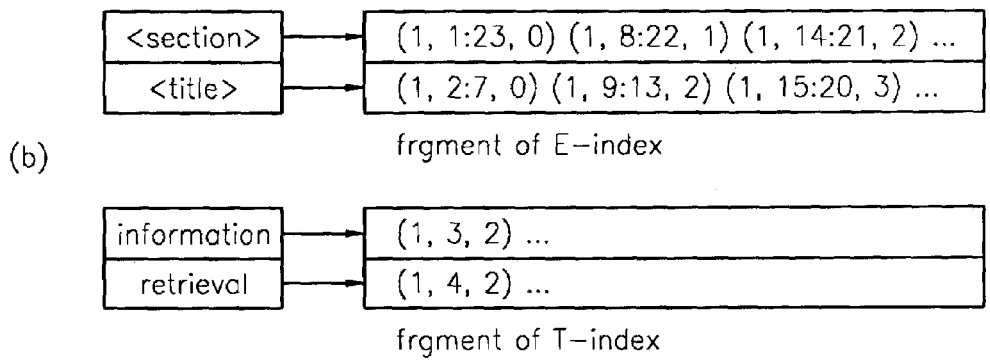

| <section> | (1, 1:23, 0) (1, 8:22, 1) (1, 14:21, 2) ... |
| <title>   | (1, 2:7, 0) (1, 9:13, 2) (1, 15:20, 3) ... | frgment of E-index

| information | (1, 3, 2) ... |
| retrieval   | (1, 4, 2) ... | frgment of T-index

FIG. 4

| REGULAR PATH EXPRESSION | SQL like SYNTAXES |
|---|---|
| A//B | pathname like '<A>%<B>' |
| A/*/B | pathname like '<A>%<B>' |
| A/?/B | pathname like '<A><%><B>' or '<A>%<B>' |
| A\|B | pathname like '<A>' or '<B>' |

| PATHNAME | PATHID | INDEXFLAG |
|---|---|---|
| <A><B> | 1 | F |
| <A><B><C> | 2 | T |
| <B><C> | 3 | F |
| <A><B><D> | 4 | T |
| <B><D> | 5 | F |

| PATHID | SORID | TARID |
|---|---|---|
| 2 | 100 | 1000 |
| 2 | 200 | 3000 |
| 4 | 500 | 4000 |
| 4 | 600 | 7000 |

FIG. 9

| REGULAR PATH EXPRESSIONS | NUMBER OF NODES |
|---|---|
| /TVAMain//Name | 2 |
| /TVAMain//Agent/Name | 3 |
| /TVAMain//CastMember/Agent/Name | 4 |
| /TVAMain//CastList/CastMember/Agent/Name | 5 |
| /TVAMain//BasicDescription/CastList/CastMember/Agent/Name | 6 |
| /TVAMain //ProgramInformation/BasicDescription/CastList/CastMember/Agent/Name | 7 |
| /TVAMain//ProgramInformationTable /ProgramInformation/BasicDescription/CastList/CastMember/Agent/Name | 8 |
| /TVAMain//ProgramDescription/ProgramInformationTable /ProgramInformation/BasicDescription/CastList/CastMember/Agent/Name | 9 |
| /TVAMain/ContentDescription/ProgramDescription/ProgramInformationTable /ProgramInformation/BasicDescription/CastList/CastMember/Agent/Name | 10 |

EXTENDED MARKUP LANGUAGE (XML) INDEXING METHOD FOR PROCESSING REGULAR PATH EXPRESSION QUERIES IN A RELATIONAL DATABASE AND A DATA STRUCTURE THEREOF

BACKGROUND OF THE INVENTION

This application claims the priority of Korean Patent Application No. 2002-25398, filed on May 8, 2002, in the Korean Intellectual Property Office, the disclosure of which is incorporated herein in its entirety by reference.

1. Field of the Invention

The present invention relates to a path index lookup method, which is an extended markup language (XML) indexing method by which a relational database can stably process a query regardless of how a user expresses the query, and more particularly, to a method for processing a regular path expression with a certain length using a PathLookup table and an ExtendedEdge table using a single joining operation.

2. Description of the Related Art

The extended markup language (XML), which has been proposed as a standard language for information exchange on the Internet, is being widely used in computers and network systems (SyncML, UpnP) and also in many other industrial fields, such as, biological information (BSML, BioML), electronic commerce (ebXML, ECML), electronic data interchange (XML-EDI), geographic information and global positioning systems (GPS) (GML, NVML), multimedia (MPEG-7, IML), entertainment (MusicXML, GML), education (LMML, TML), medical care (CTDM, TDL), publication (BiblioML, DocBook), and TV broadcasting (TV-Anytime), etc.

Data written in XML is different from typical data in an existing database like a relational database or an object-oriented database in many ways; for example, XML is semi-structured. In other words, XML provides a document type definition (DTD) adequate for an application field, but has a semi-structured characteristic in that XML does not have to strictly follow the DTD.

Due to the semi-structured characteristic of XML, data expression and interchange between different data sources are flexible. XML is used as a standard language in many application fields because of the semi-structured characteristic as well as because it involves easy data expression.

Because of the semi-structured characteristic of XML, a programmer of an XML document is allowed to transform XML data deviating from a DTD in order to produce an XML document. Also, a user of the XML document can search for data without exactly knowing the structure of XML data.

A data search based on the semi-structured characteristic of an XML can be effectively used when a user does not exactly know the structure of an XML document including data to be searched. If a user searches the web for an XML document in a particular field, the user can even obtain the results of a query about the found XML documents based on partial knowledge that does not exactly reflect the schema of the particular field.

A retrieval expression, of a user, based on the semi-structured characteristic of XML data can be expressed in a regular path expression query, for example, in an XML query, XQuery. Since the XML regular path expression query does not exactly describe the structure of data corresponding to the conditions of the query in contrast with a database query based on a typical schema, a query processing system may interpret and execute queries representing the same condition differently, according to a method in which a user defines a query. Therefore, a method in which the query processing system interprets and optimizes an XML regular path expression query may greatly affect the performance of query processing.

Examples of a method of storing an XML document in a relational database include an edge method and an attribute method. The edge method has a merit in that an XML document can be stored and processed even if there is no schema data regarding the XML document. However, the edge method may cause a degradation in performance due to a self-joining operation duplicated as much as the length of a path expression for a relatively large edge table. A joining operation denotes an operation to calculate a relationship between the elements of a table and those of another table. A self-joining operation denotes an operation to calculate a relation between the elements existing within a table.

In the attribute method, entity-unit tables are produced and processed when schema data of an XML document has already been known. Thus, data can be divided and stored in many tables, providing higher performance than the edge method. However, in the attribute method, the number of tables may excessively increase depending on an XML schema, or data may be unnecessarily fragmented.

In order to overcome these problems, research on a method of determining the type and number of tables that can be divided by using a data mining method for storing an XML document with no schema, has been conducted. Since both the edge method and the attribute method are basically provided to process a path expression, the two methods require as many table-joining operations as the length of the path expression. Also, the two methods are not suitable to process a regular path expression.

The edge method includes a method of processing a regular path expression using information of the beginning and end offsets of a tag. The edge method for processing a regular path expression is ineffective if the edge method is applied to a long path expression. The query processing performance of the edge method for processing a regular path expression depends on a method in which a user defines a query.

An example of a method of indexing a path expression of XML data is an index fabric method, in which indices for various paths existing in an XML document are managed in a signal indexing structure. The indexing structure is a structure extended to support a relational database. In the index fabric method, to process a regular path expression of a particular path, the particular path must be additionally specified as a refined path in the indexing structure.

There has been proposed a table structure that serves as an index. However, when the index fabric method is adopted to index an XML path expression, the number of index tables increases, or an index table may be fragmentated. An XML data path expression processing is similar to a path expression processing performed in an object-oriented database in that the XML data path expression processing is performed in such a way to travel around a tree.

SUMMARY OF THE INVENTION

The present invention provides an efficient XML indexing method in which a relational database uniformly interprets an XML regular path expression query regardless of how a user describes the query.

To be more specific, the present invention provides an XML indexing method for processing a regular path expression using a single joining operation regardless of the length of the regular path expression, in order to overcome a conventional problem where the performance of query processing decreases with an increase in the length of the regular path expression. The present invention also provides tables that can be used without the need to modify a relational database system engine and an XML indexing table data structure based on a B-tree.

According to one aspect of the present invention, there is provided a path index lookup method in which, first, a plurality of path information representing an information source are extracted from a document that is written in a predetermined language including an extended markup language (XML). Next, user path identification (id) information corresponding to the plurality of path information and index flag information representing whether the plurality of path information has been stored in detail in another storage unit, are received from a user and stored in a PathLookup table storage unit. Thereafter, if the index flag information corresponds to a predetermined value, a source id and a target id of the path information are received from the user and stored in an ExtendedEdge table storage unit. Then, a regular path expression used to retrieve information is received from the user, and the PathLookup table storage unit is searched for path expression information matched with the regular path expression to obtain path id information corresponding to a path of the information to be retrieved. Finally, the ExtendedEdge table storage unit is searched for a source id and a target id of path id information matched with the path id information obtained in the above step.

According to another aspect of the present invention, there is provided a computer recording medium which stores a computer program for executing the path index lookup method.

According to still another aspect of the present invention, there is provided a path index lookup device including a PathLookup table storage unit, an ExtendedEdge table storage unit, a path id retrieval unit, and a path information determination and output unit. The PathLookup table storage unit receives from a user path id information corresponding to at least one piece of path information for an information source, included in a document that is written in a predetermined language including XML, and index flag information representing whether the path information has been specified in another storage unit, and stores the path id information and the index flag information. If the index flag information has a predetermined value, the ExtendedEdge table storage unit receives a source id and a target id of each of the path information from the user and stores the source id and the target id. The path id retrieval unit receives from the user a regular path expression used to retrieve information, searches the PathLookup table storage unit for path expression information matched with the regular path expression, and obtains path id information corresponding to a path of the information to be retrieved. The path information determination and output unit searches the ExtendedEdge table storage unit for a source id and a target id of path id information matched with the path id information obtained in the path id retrieval unit and outputs the source id and target id of the matched path id information.

According to yet another aspect of the present invention, there is provided a PathLookup table used to store in a relational database a document that is written in a predetermined language including XML and includes a plurality of path information for an information source. The PathLookup table includes path name information representing the names of paths along which information to be retrieved is stored in the document, path id information representing the ids of the paths, and index flag information representing whether the paths are indexed in an ExtendedEdge table, which stores the source ids and target ids of many paths in the document. If a regular path expression used to retrieve information is received from a user, the PathLookup table is searched for path name information related to a path expression matched with the regular path expression, so that path id information corresponding to the path name information is output.

According to yet still another aspect of the present invention, there is provided an ExtendedEdge table used to store in a relational database a document that is written in a predetermined language including XML and includes a plurality of path information for an information source. The ExtendedEdge table includes path id information representing the ids of the paths along which information to be retrieved is stored in the document, source id information representing the source ids of the paths, and target id information representing the target ids of the paths. If path id information for information to be retrieved is received from a user, the ExtendedEdge table outputs source id information and target id information corresponding to the path id information.

In contrast with existing methods that provide performance dependent on the form of a user query, the path index lookup method according to the present invention can stably and quickly process a regular path expression regardless of the form of the user query.

BRIEF DESCRIPTION OF THE DRAWINGS

The above and other features and advantages of the present invention will become more apparent by describing in detail exemplary embodiments thereof with reference to the attached drawings in which:

FIG. 1A shows an embodiment of an extended markup language (XML) document representing part of a meta data specification of TV-anytime;

FIG. 3 shows an embodiment in which elements are expressed using the elements table and the texts table of FIG. 2;

FIG. 4 is a table showing SQL like syntaxes for regular path expressions;

FIG. 9 is a regular path expression table used in an experiment of the present invention.

DETAILED DESCRIPTION OF THE INVENTION

When a user indicates the path of a certain entity to be accessed within an XML document, a regular path expression shortens and expresses the path.

Figures 1B, 2:
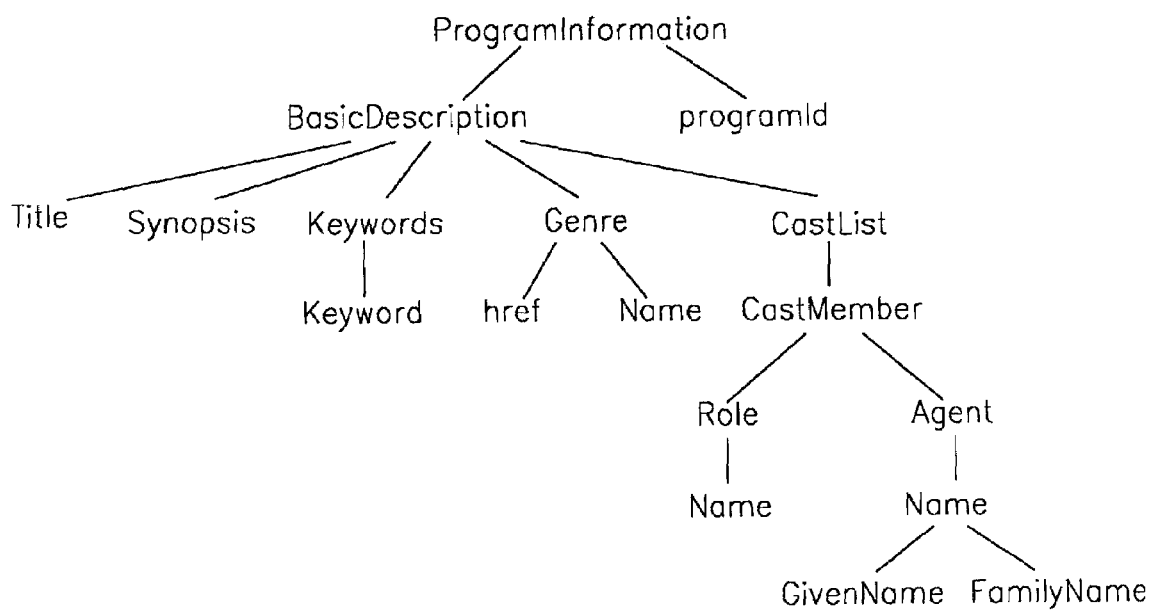
FIG. 1B shows a tree structure of an XML document that represents part of a meta data specification of TV-anytime.
FIG. 2 is a table showing major symbols used in a regular path expression and the notations of the symbols.

FIGS. 1A and 1B show an embodiment of an extended markup language (XML) document representing part of a meta data specification of TV-anytime. Meta data related to TV-anytime denotes data relating to a TV broadcasting program. The meta data includes a programId, a title, a synopsis, keywords, a genre, and a castlist. FIG. 1A shows an example of an XML document related to TV-anytime, and FIG. 1B shows a tree structure in which the contents of the XML document are expressed.

As can be seen from FIG. 1B, a tree structure of an XML document in a general business application field, such as, TV-anytime, is very large and complicated. Hence, when a user requests a search of the XML document, a definition of an exact path is not easy. If the user tries to retrieve the name of an actor who acts in a particular program, the user may define an absolute path expression enumerating from a root element to a name element, like, /ProgramInformation/BasicDescription/CastList/CastMember/Agent/Name. However, the user also can more simply define a regular path expression enumerating only the element names that the user considers necessary, like, /ProgramInformation//CastList//Agent/Name. The symbol '/' in the absolute path expression represents a direct parent-children relationship in the XML document. The symbol '//' in the regular path expression represents a general ancestor-descendant relationship extended from the parent-children relationship and is widely used in the regular path expression.

FIG. 2 is a table showing major symbols used in a regular path expression and the notations of the symbols. To be more specific, FIG. 2 shows major symbols for a regular path expression of an XML query proposed in a World Wide Web consortium (W3C), XQuery, and the notations of the major symbols. A single absolute path expression can be expressed in several regular path expressions by using the symbols of FIG. 2.

For example, the absolute path expression /ProgramInforfmation/BasicDescription/CastList/CastMember/Agent/Name can be expressed in the following various regular path expressions including the regular path expression /ProgramInformation//CastList//Agent/Name:

//CastMember//Name
/ProgramInformation/*/Agent/Name
//CastList//Agent/?

Among them, //CastMember//Name simply expresses the contents of the absolute path expression. Like this, a user can express the content of a query in different regular path expressions. Thus, a system for processing regular path expressions may provide significantly different performances depending on how to interpret a user's query.

In the prior art, a relational database provides the following two tables to process a regular path expression query related to an XML document:

Elements (term, docno, begin, end, level)
Texts (term, docno, wordno, level)

The elements table stores elements and attributes of an XML document, which are designated as tags, in a tuple of one element and one attribute. In the element table, "term" denotes a tag name, "docno" denotes the id of a document to which the tag belongs, "begin" and "end" define the offset range of the tag to which "term" belongs, and "level" denotes the frequency of duplications of an element in the XML document, that is, the number of ancestors.

The texts table stores values included in a tag of an XML document in a tuple of individual values. In the texts table, "docno" denotes the id of a certain value, "wordno" denotes the offset of the value within the XML document, and "level" denotes the frequency of duplications of an element within the XML document. In this database structure, a regular path expression is processed by performing self-joining using the offset and level values of the elements included in the elements table.

FIG. 3 shows an embodiment in which elements are expressed using the elements table and the texts table of FIG. 2. If an element, section, is described, like, (1, 1:23, 0), (1, 8:22, 1), or (1, 14:21, 2), the digit in the first column represents "docno", the group of digits in the middle column represents the "begin" and "end" offset, and the digit in the last column represents "level."

In other words, in the prior art, a regular path expression is processed by self-joining the elements table. For example, the regular path expression //CastMember//Name is expressed in the following SQL query:

Select e1
From Elements e1, Element e2
Where e1.term='CastMember'
And e2.term='Name'
And e1.begin<e2.begin
And e1.end>e2.end
And e1.docno=e2.docno This query is processed by a self-joining operation of the elements of a table for element CastMember with the elements of a table for element Name. An ancestor-descendant relationship expressed by the symbol '//' can be established based on the inclusion relation between the offsets of two elements.

In other words, if the "begin" offset of element A in an XML document is smaller than that of element B in the XML document, and the "end" offset of element A is greater than that of element B, a regular path expression A//B is established. Accordingly, the above query expresses the condition that the "begin" offset of element CastMember is smaller than that of element Name, and the "end" offset of element CastMember is greater than that of element Name.

Existing regular path expression processing methods have a problem in that the performance of a query processing system depends on how a user describes a regular path expression. In other words, the frequency of joining operations required to process a regular path expression is determined depending on how many tags have been indicated in the regular path expression.

As described above, since an absolute path expression can be transformed into several regular path expressions, the frequency of joining operations varies.

It is assumed that regular path expressions //CastMember//Name, /ProgramInformation/BasicDescription/CastList/CastMember/Agent/Name, and /ProgramInformation//CastList//Agent/Name represent the same content. Regular path expression //CastMember//Name requires only one joining operation. Regular path expression "/ProgramInformation/BasicDescription/CastList/CastMember/Agent/Name" requires five joining operations. Regular path expression /ProgramInformation//CastList//Agent/Name requires three joining operations.

As described above, existing regular path expression processing methods have many problems and thus are not adequate for practical application fields. Therefore, a technique of storing and retrieving an XML document has been considered a technical bottleneck in application fields relating to XML.

In a path index look-up method according to the present invention proposed to overcome the above problem, the following two tables are added to the existing elements table and texts table in order to index an XML document:

PathLookup (pathname, pathid, indexflag)
ExtendedEdge (pathid, sorid, tarid)

The PathLookup table stores possible paths obtained after parsing an XML document in tuples. In the PathLookup table, "pathname" denotes the name of a path, "pathid" denotes the id of the path, and "indexflag" denotes whether the path is indexed in an ExtendedEdge table. The ExtendedEdge table stores index information of paths that are 1 or greater in length. In the ExtendedEdge table, "pathid" denotes the id of a path that indicates a tuple in the PathLookup table, and "sorid (source id)" and "tarid (target id)" denote the id of an element in the elements table.

When an XML document is input to a database, all possible path names are extracted and stored in tuples together with their ids in the PathLookup table. Since paths for an XML document can be extracted during parsing of the document, a DTD of the XML document or an XML schema thereof is not necessary.

In a tree structure of an XML document, there may exist k paths ending with A among possible paths for node A with a k-th level from a root level, which are 1 or greater in length. Here, it should be noted that upon extraction of paths for a document, paths extracted from the previous document are not input to the database. Thus, even when large XML documents with similar data structures are input to the database, the size of a PathLookup table does not greatly increase.

The PathLookup table serves as an index for rapidly converting a user-input regular path expression into a path that actually exists in an XML data space. An operation for mapping the user-defined regular path expression to paths stored in the PathLookup table is executed using an SQL like syntax.

To facilitate mapping of a regular path expression using an SQL like syntax, when the name of a path is stored in the PathLookup table, a tag is attached to each of the nodes of a path, and the name of the resultant path is then stored therein. For example, a path 'A/B/C' is stored in the form of '<A><B><C>'.

FIG. 4 is a table showing SQL like syntaxes for regular path expressions. To retrieve paths from a PathLookup table using the SQL like syntaxes of FIG. 4, the following SQL syntax is written from the above-exampled regular path expression /ProgramInformation//CastList//Agent/Name:

Select pathid
From PathLookup
Where pathname like
'<ProgramInformation>%<CastList>%<Agent><Name>';

Meanwhile, the ExtendedEdge table is a path indexing table for rapidly processing a path for an XML document. Since each of the tuples in the ExtendedEdge table has a pathid for lookup, the tuples of the PathLookup table are referred to.

A field value indicating the start node (sorid) and end node (tarid) of each path refers to the tuples of the elements table. If the end node (tarid) indicates a text instead of an element, the end node (tarid) refers to the tuples of the texts table. It should be noted that in contrast with an existing edge method in which paths are processed by repeated join operations, the ExtendedEdge table has a structure in which a very long path can be accessed by one join operation without need of additional join operations.

Figures 5A, 5B, 5C:
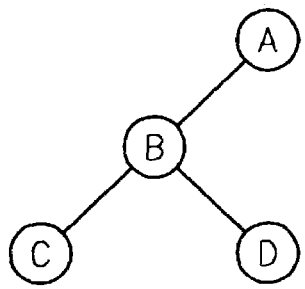
FIG. 5A shows an embodiment of an input XML document.
FIG. 5B shows an embodiment of a PathLookup table for an XML document according to the present invention.
FIG. 5C shows an embodiment of an ExtendedEdge table for an XML document according to the present invention.

FIG. 5A shows an embodiment of an input XML document. FIG. 5B shows an embodiment of a PathLookup table for the XML document of FIG. 5A. FIG. 5C shows an embodiment of an ExtendedEdge table for the XML document of FIG. 5A. In other words, FIG. 5A shows the structure of an input XML document, and FIG. 5B shows a PathLookup table of paths newly generated when an XML document is input. A field indexflag of the PathLookup table of FIG. 5B represents whether the newly-generated paths are indexed in the ExtendedEdge table.

It can be seen from FIG. 5B that only paths /A/B/C and /A/B/D are indexed in the ExtendedEdge table. Since the ExtendedEdge table is proportional to the square of the number of nodes of an XML document, if all paths are indexed, the size of the ExtendedEdge table may be excessively enlarged. Thus, only paths classified to be indexed are stored in the ExtendedEdge table.

The ExtendedEdge table of FIG. 5C stores actual path instances of paths /A/B/C and /A/B/D indicated in the indexflag field of the PathLookup table of FIG. 5B.

In the ExtendedEdge table, since tuples indicated with a pathid found in the PathLookup table for a given regular path expression are accessed, the pathid is designated as a key field of the ExtendedEdge table. If a B-tree index is used in the key field, the path corresponding to the pathid can be very quickly accessed.

In the process of a regular path expression using a path index lookup method, first, possible path expressions for the regular path expression are found from the PathLookup table, and the ids of the possible paths are obtained. Thereafter, the sorid and tarid values corresponding to the obtained path ids are obtained from the ExtendedEdge table. The above two steps can be expressed in pathid joining operations.

Figure 6:
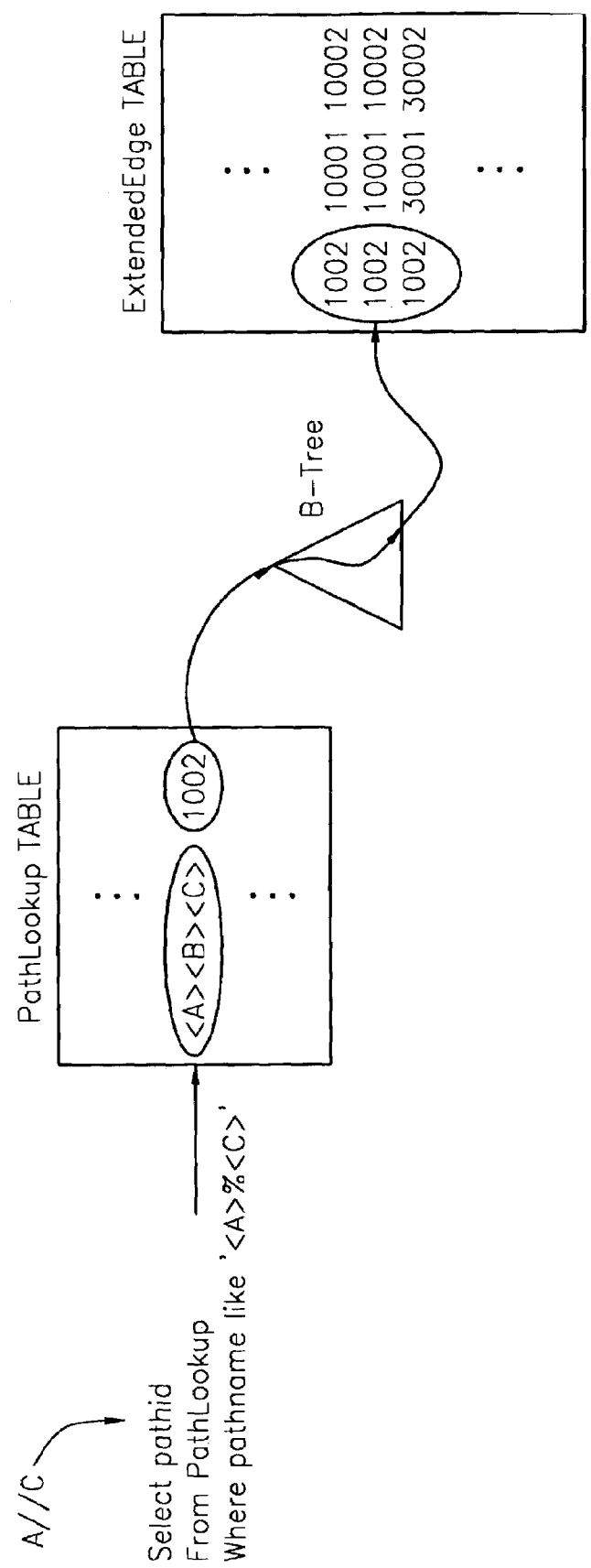
FIG. 6 is a structural diagram for illustrating a path index look-up method according to the present invention.

FIG. 6 is a structural diagram for illustrating a path index look-up method according to the present invention. As shown in FIG. 6, in a path index lookup method according to the present invention, a regular path expression is processed through a PathLookup table search and an ExtendedEdge table B-tree search, regardless of the type of a regular path expression defined by a user.

Figure 7:
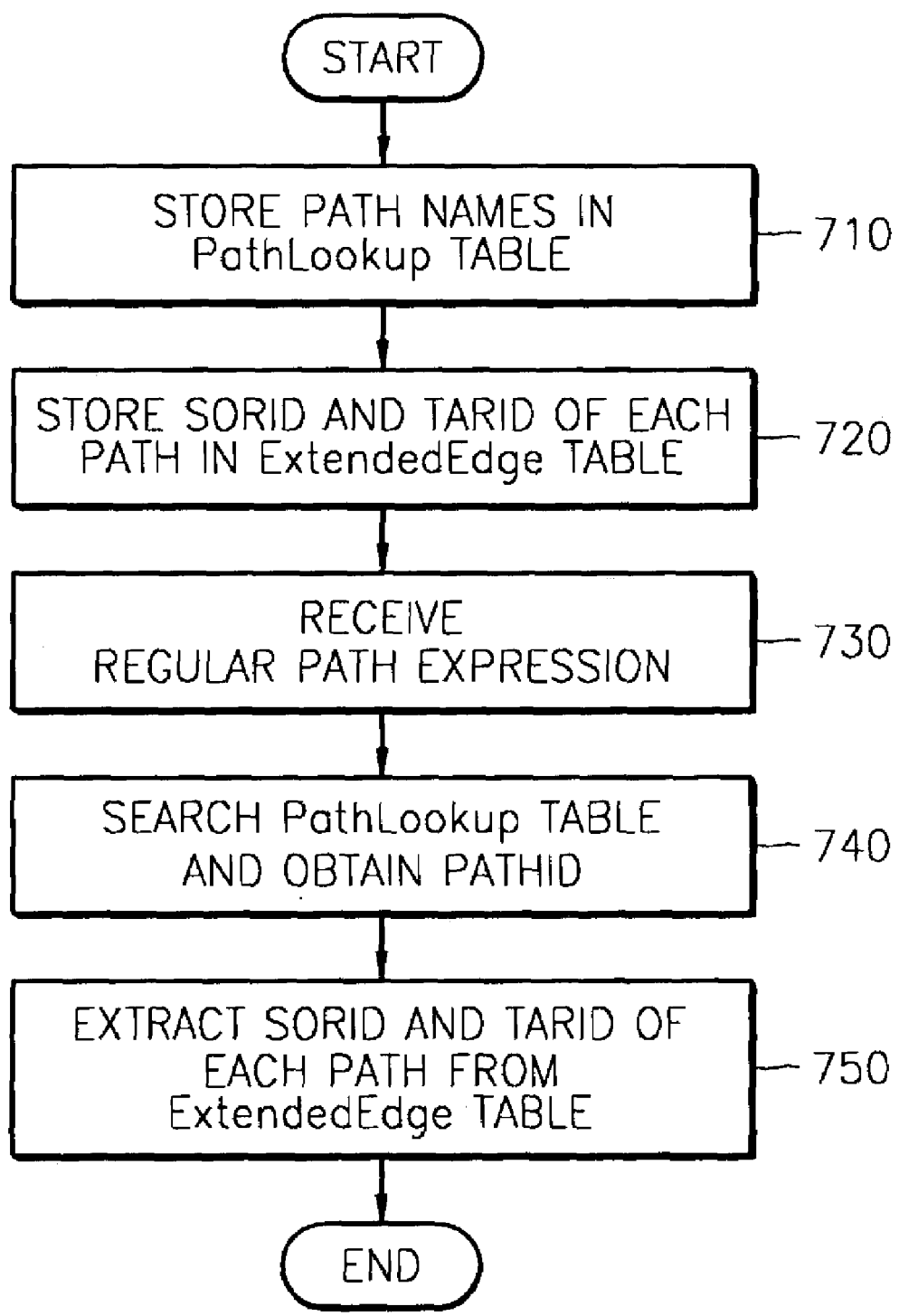
FIG. 7 is a flowchart for illustrating a path index look-up method for regular path expression queries, according to the present invention.

When a regular path expression for a TV-anytime XML document, /ProgramInformation//CastList//Agent/Name, is processed in an existing method, the following SQL syntax is obtained:

Select e4.1d
  From Elements e1,
  Elements e2,
  Elements e3,
  Elements e4
Where e1.tagname='ProgramInformation'
And e2.tagname='CastList'
And e3.tagname='Agent'
And e4.tagname='Name'
And e1.docno=e2.docno
And e1.begin<e2.begin
And e1.end>e2.end
And e2.docno=e3.docno
And e2.begin<e3.begin
And e3.docno=e4.docno
And e3.level=e4.level 1;

That is, the SQL syntax for an existing regular path expression processing method includes three joining operations. However, the following SQL syntax for a path index lookup method according to the present invention is processed through one joining operation:
Select eet. Tarid
From PathLookup pl,
ExtendedEdge ee
Where pl. pathname like '/ProgramInformation % CastList % Agent/Name'
And pl. pathid=ee.pathid FIG. 7 is a flowchart for illustrating a path index look-up method for regular path expression queries, according to the present invention. In step 710, all possible path names are extracted from an XML document and stored in a PathLookup table together with pathid information and indexflag information. In step 720, the solid and tarid of each of the pathids are stored in an ExtendedEdge table.

In step 730, a regular path expression is received. In step 740, the PathLookup table is searched for a path expression corresponding to the regular path expression, and the pathid of the path expression is obtained. Here, the pathid of the path is obtained from the PathLookup table using an SQL like syntax. The obtained pathid serves as a join key during a joining operation.

In step 750, the ExtendedEdge table is searched for the sorid and tarid of the path by using the obtained pathid as a search key. Here, the ExtendedEdge table is B-tree searched.

Figure 8:
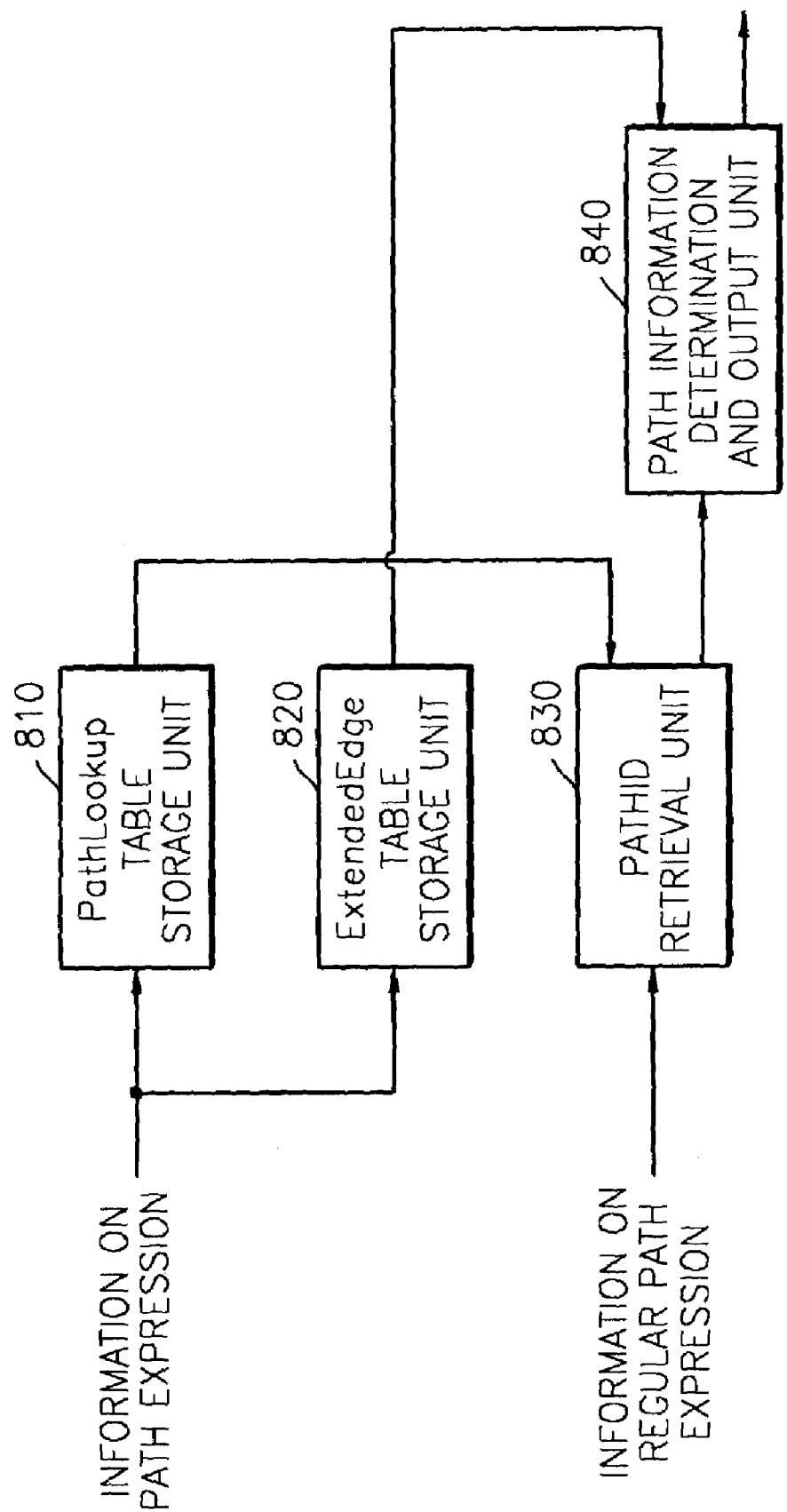
FIG. 8 is a block diagram of a path index look-up device for regular path expression queries, according to the present invention.

FIG. 8 is a block diagram of a path index look-up device for regular path expression queries, according to the present invention. The path index lookup device includes a path lookup table storage unit 810, an ExtendedEdge table storage unit 820, a pathid retrieval unit 830, and a path information determination and output unit 840.

The path lookup table storage unit 810 extracts a plurality of path information from an XML document and stores them together with pathid information and indexflag information received from a user. The path information, pathid information, and indexflag information are stored in the format of a table as shown in FIG. 5B.

The ExtendedEdge table storage unit 820 receives sorid and tarid information relating to each pathid from the user and stores them in the format of a table as shown in FIG. 5C.

The pathid retrieval unit 830 receives information on a regular path expression from the user and retrieves a path corresponding to the regular path expression to obtain a pathid of the path.

The path information determination and output unit 840 searches the ExtendedEdge table storage unit 820 for path information corresponding to the pathid obtained in the pathid retrieval unit 830, extracts sorid and tarid information from the path information, and outputs them.

An experiment to compare the performance of the path index lookup method for regular path expression queries, according to the present invention, with the performance of an existing offset-joining method was performed. In the experiment, 1200 TV-anytime documents were input to a relational database system, PostgreSQL, and the number of nodes of the elements of a table after the input was completed was about 1,000,000.

FIG. 9 is a regular path expression table used in the above experiment. As shown in FIG. 9, the experiment measured a reaction period of time required to process regular path expressions with 2 to 9 nodes.

Figure 10:
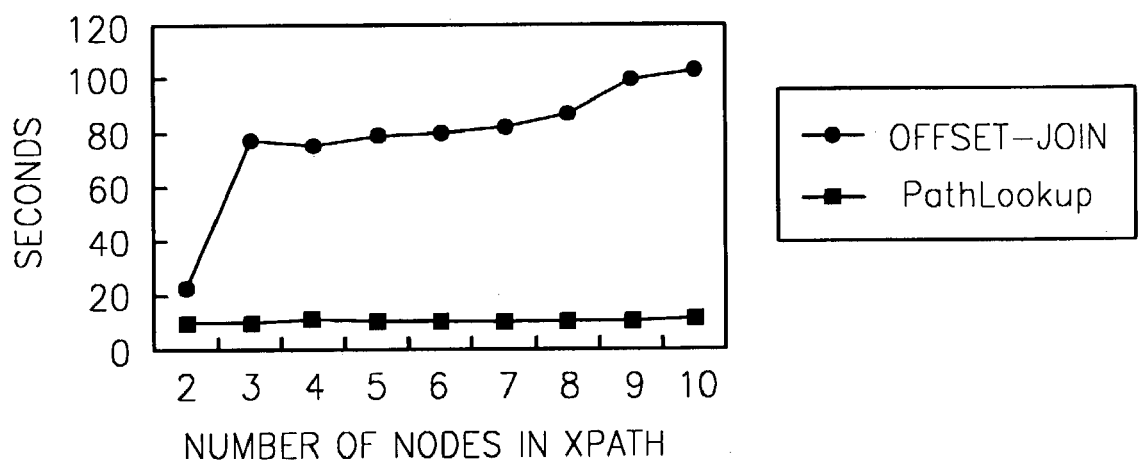
FIG. 10 is a graph showing variations in a reaction period of time with respect to the number of nodes in a regular path expression according to the present invention.

FIG. 10 is a graph showing variations in a reaction period of time with respect to the number of nodes in a regular path expression. In FIG. 10, the offset-join denotes a reaction time in the existing offset-joining method, and the pathlookup denotes a reaction time in the path index lookup method according to the present invention.

As shown in FIG. 10, in the existing offset-joining method, the reaction time increases as a regular path expression becomes longer. On the other hand, the path index lookup method, according to the present invention, provides a uniform, excellent performance without being sensitive to the length of a regular path expression. Even when the number of nodes in a regular path expression is 2, that is, even when only one join operation is required in the existing offset-join method, the pathlookup takes less time than the offset-join because the path index lookup method enables an ExtendedEdge table to fast access the tuples of a path expression using a B-tree. Thus, the path index lookup method provides better performance than the existing offset-joining method. Also, because the existing offset-joining method uses the inclusion relationship between offsets, the offset-join method takes longer than the pathlookup method, according to the present invention.

The embodiments of the present invention can be written as computer programs, stored in a computer readable recording medium, and executed in general-use digital computers. The structure of data used in the embodiments of the present invention can also be recorded on the computer readable recording medium in many ways. Examples of computer readable recording media include magnetic storage media (e.g., ROM, floppy disks, hard disks, etc.), optical recording media (e.g., CD-ROMs, or DVDs), and a storage medium such as a carrier wave (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, the present invention provides a method of processing a regular path expression, which is a core part of the format of an XML query, using a single joining operation regardless of the form of a query made by a user. Accordingly, the method can be effectively used in an electronic program guide (EPG), an information indexing and retrieving engine of digital TVs, and other various information apparatuses that require storing XML documents.

Furthermore, in the present invention, XML documents are efficiently indexed and stored in a relational database. Thus, a regular path expression query, which is a core user XML query type, is stably and quickly processed regardless of the format of a query made by a user. In particular, in contrast with the prior art in which regular path expressions are unstably processed due to dependency on the format of a query made by a user, the present invention can process a regular path expression having one joining operation regardless of the format of a query made by a user.

What is claimed is:

1. A path index lookup method comprising:
   extracting a plurality of path information representing an information source from a document that is written in a predetermined language;
   receiving identification (id) information corresponding to the plurality of path information and index flag information indicating whether a respective piece of the plurality of path information has been stored in a storage unit, and storing path id information and the index flag information in a PathLookup table storage unit;
   receiving a source id and a target id of said respective piece of the plurality of path information and, if the index flag information corresponds to a predetermined value, storing the source id and the target id of said respective piece of the plurality of path information in an ExtendedEdge table storage unit,;

receiving a regular path expression used to retrieve information, searching the PathLookup table storage unit for path expression information that matches the regular path expression, and obtaining path id information corresponding to a path of the information to be retrieved; and searching the ExtendedEdge table storage unit for a source id and a target id of path id information that matches said path id information corresponding to the path of the information to be retrieved.

2. The path index lookup method of claim 1, wherein the predetermined language comprises an extended markup language (XML).

3. The path index lookup method of claim 1, wherein at least one of the path id information, the source id and the target id of said respective piece of the plurality of path information, and said regular path expression, are received from a user.

4. The path index lookup method of claim 1, wherein the path expression information stored in the PathLookup table storage unit comprises:

path name information representing a respective name of at least one path along which information to be retrieved in the document is stored;

path id information representing a respective id of said at least one path; and index flag information indicating whether said at least one path is indexed in the ExtendedEdge table, which stores a respective source id and respective target id of said at least one path in the document.

5. The path index lookup method of claim 1, wherein an ExtendedEdge table comprises:

path id information representing a respective id of at least one path along which information to be retrieved in the document is stored;

source id information representing a respective source id of said at least one path; and target id information representing a respective target id of said at least one path.

6. A computer recording medium which stores a computer program for executing a path index lookup method, the method comprising:

extracting a plurality of path information representing an information source from a document that is written in a predetermined language including an extended markup language (XML);

receiving path identification (id) information corresponding to the plurality of path information and index flag information representing indicating whether a respective piece of the plurality of path information have has been stored in detail in another storage unit, and storing the path id information and the index flag information in a PathLookup table storage unit;

receiving a source id and a target id of said respective piece of the plurality of path information and, if the index flag information corresponds to a predetermined value, storing the source id and the target id of said respective piece of the plurality of path information in an ExtendedEdge table storage unit;

receiving a regular path expression used to retrieve information, searching the PathLookup table storage unit for path expression information matched with that matches the regular path expression, and obtaining path id information corresponding to a path of the information to be retrieved; and searching the ExtendedEdge table storage unit for a source id and a target id of path id information matched with that matches the said path id information corresponding to a path of the information to be retrieved.

7. A path index lookup device comprising:

a PathLookup table storage unit receiving path identification (id) information corresponding to at least one piece of path information of an information source, included in a document that is written in a predetermined language, and index flag information indicating whether said at least one piece of path information has been stored in another storage unit, and storing said path id information and the index flag information;

an ExtendedEdge table storage unit receiving a source id and a target id of said at least one piece of path information and, if the index flag information has a predetermined value, storing the source id and the target id;

a path id retrieval unit receiving a regular path expression used to retrieve information, searching the PathLookup table storage unit for path expression information that matches the received regular path expression, and obtaining path id information corresponding to a path of the information to be retrieved; and a path information determination and output unit searching the ExtendedEdge table storage unit for the source id and the target id corresponding to path id information that matches said path id information obtained in the path id retrieval unit, and outputting the source id and target id corresponding to the matched path id information.

8. The device according to claim 7, wherein the PathLookup table storage unit receives said path id information corresponding to said at least one piece of path information of an information source, from a user, the predetermined language comprises an extended markup language (XML), and the path id retrieval unit receives the regular path expression used to retrieve information, from a user.

* * * * *